Patented May 25, 1937

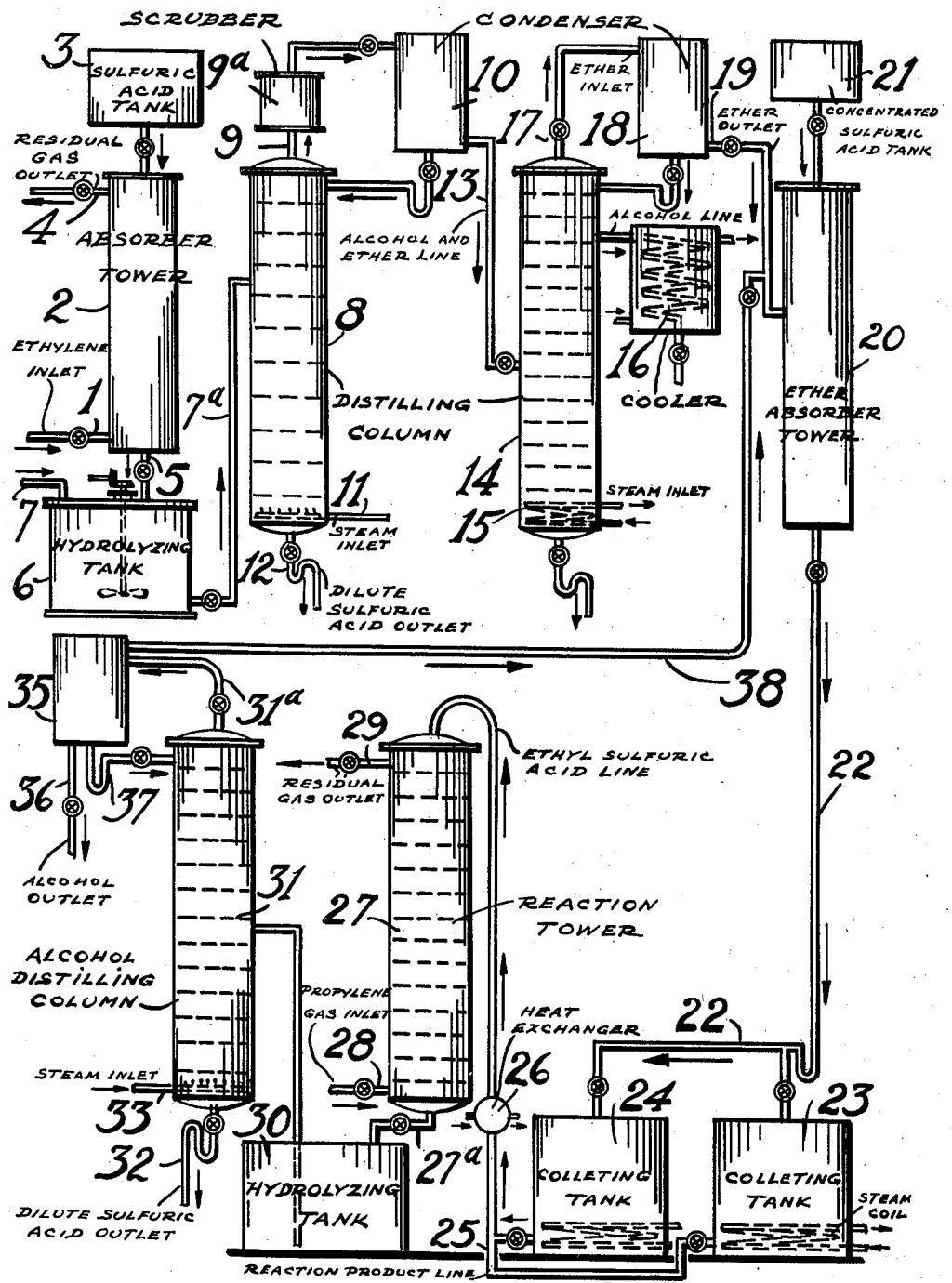

2,081,166

UNITED STATES PATENT OFFICE 2,081,166

PROCESS OF MAKING ALCOHOLS BY USE OF ETHYL SULPHURIC ACID

Benjamin T. Brooks, Old Greenwich, Conn., assignor to Standard Alcohol Company

Application December 23, 1935, Serial No. 55,792

10 Claims. (Cl. 260—156)

This invention relates to improvements in the manufacture of alcohols, particularly ethyl, isopropyl, secondary butyl, and tertiary butyl alcohols. Instead of the conventional acid solution, such as sulphuric acid, the present invention utilizes mono-ethyl sulphate (ethyl sulphuric acid) or another suitable mono-alkyl sulphate, preferably in sulphuric acid solution. The mono-ethyl sulphate is prepared from ethyl ether formed as a by-product in the alcohol reaction. Better results are obtained through the elimination of the side reactions induced by sulphuric acid when used alone, and economies are effected.

The formation of ethers in the process of making alcohols by sulphating olefins and hydrolyzing the resulting product is a disadvantage when maximum yields of alcohol are desired. An important object of the present invention is to utilize ethers so formed, especially ethyl ether, by converting it into mono-ethyl sulphate, which will serve as an improved sulphating agent for olefins, such as ethylene, propylene and the butylenes. Similarly, propyl and butyl ethers or the like may be utilized. Ethers may of course be obtained from any desired source, but for economy ethers formed in the process should be used.

Another object of the invention is to control the sulphation reaction and render it less drastic by semi-neutralizing sulphuric acid, that is to say, using it in the form of the mono-alkyl sulphate, particularly mono-ethyl sulphate, in accordance with the following general equations:

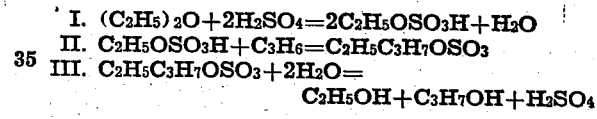

Thus, in accordance with Equation I, one molecular proportion of ethyl ether requires two molecular proportions of sulphuric acid for the formation of two molecules of mono-ethyl sulphate. In the improved process, represented by Equations II and III, a substantial economy of sulphuric acid is obtained by reacting upon the mono-ethyl sulphate with propylene, to form ethyl-isopropyl sulphate, which is then hydrolyzed to produce a mixture of ethyl and isopropyl alcohols. A small proportion of a mixture of ethers may be formed which are returned to the cycle of operations, i. e., treated with sulphuric acid to form mono-alkyl sulphates which are in turn reacted with more propylene.

A further object of the invention is to secure initially the beneficial effect of mono-alkyl sulphates; that is, without waiting for them to be formed in the sulphation of the olefins.

In a preferred form of the process of the present invention, ethyl ether, or a mixture of ethers containing for example ethyl ether, ethyl isopropyl ether and di-isopropyl ether, or one or more of these ethers, is dissolved in an excess of sulphuric acid having a concentration within the range of about 88 per cent to 98 per cent $H_2SO_4$, and the sulphuric acid solution is then heated to 100–120° C. for about one hour or until the formation of alkyl acid sulphates is substantially complete. The alkyl acid sulphate may advantageously be present in the amount of 10 to 20% by volume of the sulphuric acid. Higher concentrations, up to 100% alkyl acid sulphate, are suitable, but usually less convenient to prepare. The acid reaction product containing alkyl acid sulphates and sulphuric acid is then cooled and used for reacting with an olefin, especially propylene or a gas mixture containing propylene. The final reaction product thus obtained is hydrolyzed and distilled to give ethyl and isopropyl alcohols.

This combination of operations has advantages over treating propylene, or gas containing propylene, with sulphuric acid alone. When treating propylene with sulphuric acid, the reaction is increasingly rapid as the concentration of the acid is increased within the range 85–98% $H_2SO_4$ and is very difficult to control, as by cooling the acid mixture, when acid concentrations greater than about 91 per cent $H_2SO_4$ are employed. Mono-ethyl sulphate, or sulphuric acid containing substantial proportions of mono-ethyl sulphate is milder in its reaction with propylene and the process is more easily controlled. Side reactions such as polymer and tar formation are greatly reduced. Moreover, the mono-alkyl sulphate appears to have an accelerating effect on the olefin absorption. This can be observed in the usual process, for when the acid begins to be alkylated, the absorption rate rises, up to the point where the acid approaches exhaustion.

Another advantage of the present invention is in the higher yield of alcohols obtained by the use of a given quantity of acid. Thus, in the absorption of propylene by sulphuric acid, the proportion of di-isopropyl sulphate which is formed is greatly affected by the percentage of water in the sulphuric acid used. Thus an acid solution containing 85–88% sulphuric acid will form less di-isopropyl sulphate than a solution of 91–93% sulphuric acid. Side reactions, such as polymerization and tar formation, and the difficulties of control by cooling, render it difficult or practically impossible to build up very high concentrations of di-isopropyl sulphate with acid containing less than 9 per cent water. However, an acid solution containing 98 per cent sulphuric acid can be used in converting ethyl ether to mono-ethyl sulphate and the resulting mono-ethyl sulphate can then be employed to react smoothly with propylene to form large proportions of ethyl-isopropyl sulphate, with a corresponding increase in acid efficiency or higher yield of alcohols per given quantity of acid.

Further objects and advantages of the invention will be apparent from the following description, read in connection with the accompanying drawing, in which the single figure is a diagrammatic side elevation of suitable equipment for carrying out the process, as applied to the manufacture of isopropyl alcohol. Ethylene or gas containing ethylene is passed through a pipe 1 into the olefin absorbing tower 2. Sulphuric acid is passed into absorber 2 from a source of supply 3 and residual gas escapes from the absorber through the exit pipe 4. The reaction product of ethylene and sulphuric acid (acid liquor) flows from absorber 2 through a pipe 5 to a hydrolyzing tank 6. The absorption of the ethylene is carried out at temperatures within the range 70–110° C. and may be maintained under pressure. It will be understood that suitable valves and pumps, not shown, for maintaining the pressure in the absorber 2, are used.

Hydrolyzing tank 6 is supplied with water through a pipe 7. The water supplied to hydrolyzer 6 is preferably preheated to maintain the temperature of the hydrolyzer at about 80° C. The diluted and hydrolyzed or partially hydrolyzed reaction mixture is removed from hydrolyzer 6 by pipe 7 to a distilling column 8, where the hydrolysis is completed and the volatile products, ethyl alcohol and ethyl ether, are removed as vapors through a pipe 9 and conducted to a condenser 10. The alcohol and ether vapors may be scrubbed by hot alkali solution in a scrubber 9a to remove sulphur dioxide before passing to condenser 10. Steam is introduced into column 8 by a steam inlet pipe 11 and dilute sulphuric acid is removed through a pipe 12.

The mixture of alcohol and ether condensed in condenser 10 is passed continuously by a pipe 13 to a column still 14, or the like, for separating the ether and alcohol. A steam heating coil 15 is located near the bottom of column 14. Alcohol is taken from a plate near the top of the column through a cooler 16, and the ether is taken as vapor through a pipe 17 to a condenser 18.

Ethyl ether is passed from condenser 18 by a pipe 19 to an absorbing tower 20 where it meets concentrated sulphuric acid which is passed into the tower from a source of supply 21. The solution of ether in sulphuric acid is passed from tower 20 by a pipe 22 to collecting tanks 23 and 24 which are heated by suitable means, as by steam coils, so regulated as to maintain a temperature of about 100–110° C.

The acid reaction product is removed from tanks 23 and 24 by a pipe 25 to a cooler or heat exchanger 26 where it is cooled to about 20° C. The mono-ethyl sulphate then passes into the top of a reaction tower 27 where it meets an ascending stream of gaseous propylene or gas containing propylene. The propylene enters the reaction tower by a pipe 28 and the residual gases are removed through a pipe 29. The acid reaction product containing ethyl-isopropyl sulphate is passed from the bottom of reaction tower 27 through a line 27a to a hydrolyzing tank 30 and after hydrolysis the solution is distilled, as for example in a distilling column such as shown diagrammatically at 31.

Dilute sulphuric acid is removed by a pipe 32 and steam is passed into column 31 by a pipe 33. The volatile products, mainly ethyl and isopropyl alcohols and small proportions of ethers, are removed as vapor from the top of distilling column 31 by a pipe 31a, condensed and redistilled as in 35, and withdrawn through a line 36, or the ethers may be separated as the more volatile overhead product and alcohol removed, as indicated from a plate near the top of column 31, by a pipe 34. The small proportion of ethers formed from the mixed ethyl-isopropyl sulphate may optionally be returned to the absorbing tower 20 through line 38, or otherwise disposed of.

The foregoing description has dealt mainly with the production of isopropyl alcohol. It will be understood, however, that the principles of the invention are also applicable to the butylenes. Thus, the four-carbon atom fraction obtained from petroleum refinery gases may be reacted with mono-ethyl sulphate. It is usually not desirable to attempt the separation of the ethyl and isopropyl alcohols, as this is difficult and for many purposes the mixture serves as well as or better than the pure alcohols. The butyl alcohols, however, may be readily separated from the reaction mixture by fractional distillation. When preparing butyl alcohols, the acid reaction product should not only be cooled but the ethyl sulphuric acid should be diluted with water to bring the acid concentration down to about 80–90% sulphuric acid before treating the butylene.

Where butylenes are referred to herein, the term is intended to mean butene-1, butene-2, or isobutylene, where the context so permits. The temperature of treatment should be about 20° C.

Sulphuric acid is usually to be preferred, but phosphoric acid and other suitable poly-basic mineral acids may be used. The ether absorption in the acid will be conducted so as to leave a portion of the acid hydrogen available for olefin reaction.

The foregoing description is merely illustrative and various changes may be made within the scope of the appended claims in which it is my intention to claim all novelty inherent in the invention as broadly as the prior art permits.

I claim:

1. Process of making an alcohol, comprising reacting an aliphatic ether with a poly-basic mineral acid to make an alkyl compound containing residual acid hydrogen capable of reacting with olefins, reacting an olefin with the alkyl compound and hydrolyzing the resulting compound to produce an alcohol.

2. Process of making alcohol, comprising reacting an aliphatic ether with sulphuric acid to make a mono-alkyl sulphate, treating an olefin with the mono-alkyl sulphate and hydrolyzing the resulting compound to form an alcohol.

3. Process of making isopropyl alcohol, comprising reacting ethyl ether with sulphuric acid, bringing the resulting mono-ethyl sulphate into contact with propylene and hydrolyzing the ethyl isopropyl sulphate to produce isopropyl alcohol.

4. Method of making ethyl and isopropyl alcohol, comprising reacting ethylene with sulphuric acid under conditions to form an ethyl sulphate, hydrolyzing the ethyl sulphate to form alcohol and a minor proportion of ethyl ether, preparing mono-ethyl sulphate from the ethyl ether, reacting propylene with the mono-ethyl sulphate, and hydrolyzing the resulting ethyl isopropyl sulphate to form the corresponding alcohols.

5. Method of making an acid liquor adapted to be converted into a butyl alcohol, comprising reacting an aliphatic ether with sulphuric acid to form a mono-alkyl sulphate, and treating a butylene with the mono-alkyl sulphate.

6. Process according to claim 5 in which the ether is obtained as a by-product in the manufacture of ethyl or isopropyl alcohol.

7. Process according to claim 5 in which the ether is ethyl ether obtained as a by-product in the manufacture of ethyl alcohol.

8. Process of making alcohols from hydrocarbon gases containing olefins, comprising passing the gases through an initial acid treatment stage in which the olefins are sulphated, with the production of ethers as by-products, reacting the ethers with sulphuric acid to form mono-alkyl sulphate, treating an olefin with the mono-alkyl sulphate, and hydrolyzing the resulting di-alkyl sulphate.

9. Process according to claim 8 in which the ether obtained is predominantly ethyl ether and the olefins reacted with the mono-alkyl sulphate are butylenes.

10. A cyclic process for the manufacture of alcohols from olefin-containing gases, comprising absorbing the olefin in sulphuric acid to make a di-alkyl sulphate, hydrolyzing and distilling the di-alkyl sulphate to form alcohol and ether as a by-product, withdrawing the alcohol, absorbing the ether in sulphuric acid and converting it into mono-alkyl sulphate, reacting the mono-alkyl sulphate with an olefin to produce a di-alkyl sulphate, hydrolyzing the di-alkyl sulphate with the production of alcohol and a minor proportion of ether, withdrawing the alcohol, and returning the ether to the ether absorbing step.

BENJAMIN T. BROOKS.